United States Patent
Diamond et al.

(10) Patent No.: US 12,503,170 B2
(45) Date of Patent: Dec. 23, 2025

(54) DYNAMICALLY DEPLOYABLE ADAPTIVE MUD FLAPS

(71) Applicant: FORD GLOBAL TECHNOLOGIES, LLC, Dearborn, MI (US)

(72) Inventors: Brendan F. Diamond, Grosse Pointe, MI (US); Courtney Wright, Arvada, CO (US); Anthony Maraldo, Southgate, MI (US); David Michael Russell, Ann Arbor, MI (US); Keith Weston, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 415 days.

(21) Appl. No.: 17/991,329

(22) Filed: Nov. 21, 2022

(65) Prior Publication Data

US 2024/0166271 A1     May 23, 2024

(51) Int. Cl.
 *B62D 25/18*     (2006.01)
 *B60W 40/06*     (2012.01)

(52) U.S. Cl.
 CPC ........... *B62D 25/182* (2013.01); *B60W 40/06* (2013.01); *B60W 2420/403* (2013.01); *B60W 2520/26* (2013.01); *B60W 2555/20* (2020.02)

(58) Field of Classification Search
 CPC .................................................... B62D 25/182
 See application file for complete search history.

(56) References Cited

U.S. PATENT DOCUMENTS

| | | | |
|---|---|---|---|
| 10,207,744 | B1 | 2/2019 | Smith |
| 2009/0289446 | A1* | 11/2009 | Proctor ................. B62D 25/182 |
| | | | 280/847 |
| 2013/0282235 | A1 | 10/2013 | Kamminga et al. |
| 2022/0258809 | A1* | 8/2022 | Kim ........................ B62D 37/02 |
| 2023/0339547 | A1* | 10/2023 | Salter .................... B62D 25/182 |
| 2024/0034415 | A1* | 2/2024 | Williams ............. B62D 25/182 |
| 2024/0351640 | A1* | 10/2024 | Reus ..................... B62D 25/182 |

FOREIGN PATENT DOCUMENTS

| | | |
|---|---|---|
| EP | 3377394 B1 | 12/2019 |
| EP | 3590794 A1 | 1/2020 |
| FR | 2905342 A1 | 3/2008 |
| FR | 2994414 A1 | 2/2014 |

* cited by examiner

*Primary Examiner* — Erez Gurari
(74) *Attorney, Agent, or Firm* — Joseph Zane; Brooks Kushman P.C.

(57) ABSTRACT

A vehicle includes one or more actuatable mudflap portions provided to the vehicle, capable of deployment and retraction to respectively increase and decrease deflection of wheel-spray and receives vehicle sensor information indicating driving conditions. The vehicle examines the sensor information to determine the presence of a first condition predefined as suitable for deployment of at least one of the mudflap portions. Further, the vehicle examines the sensor information to determine that no one or more of second conditions predefined as blocking deployment are met and, responsive to the presence of the first condition and the absence of the second conditions, automatically deploys the at least one mudflap portion.

18 Claims, 4 Drawing Sheets

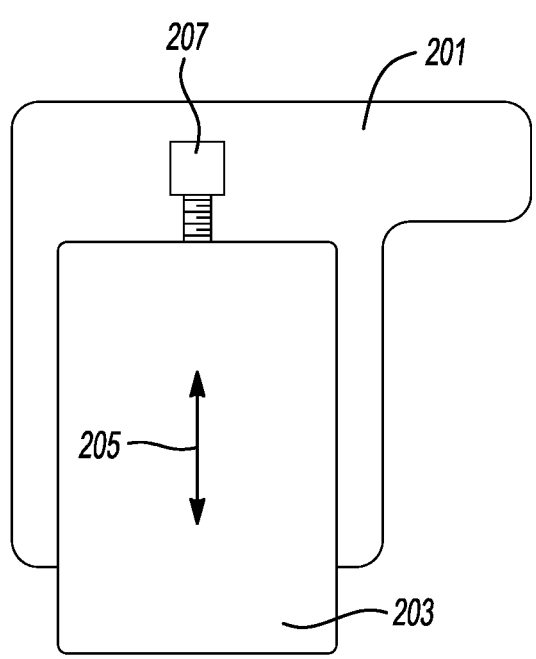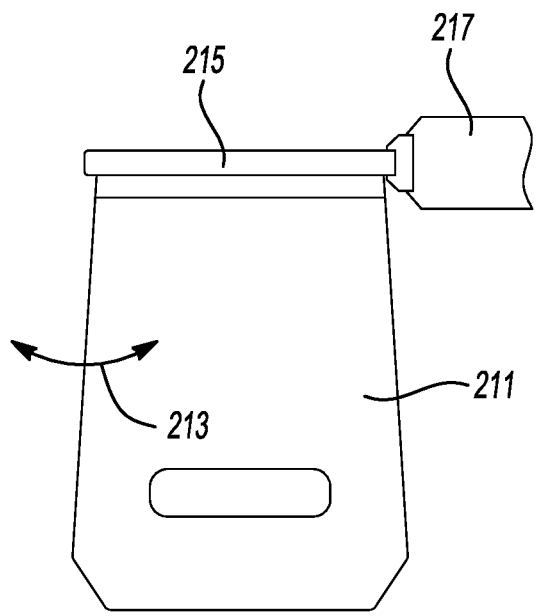
*Fig-2A*  *Fig-2B*
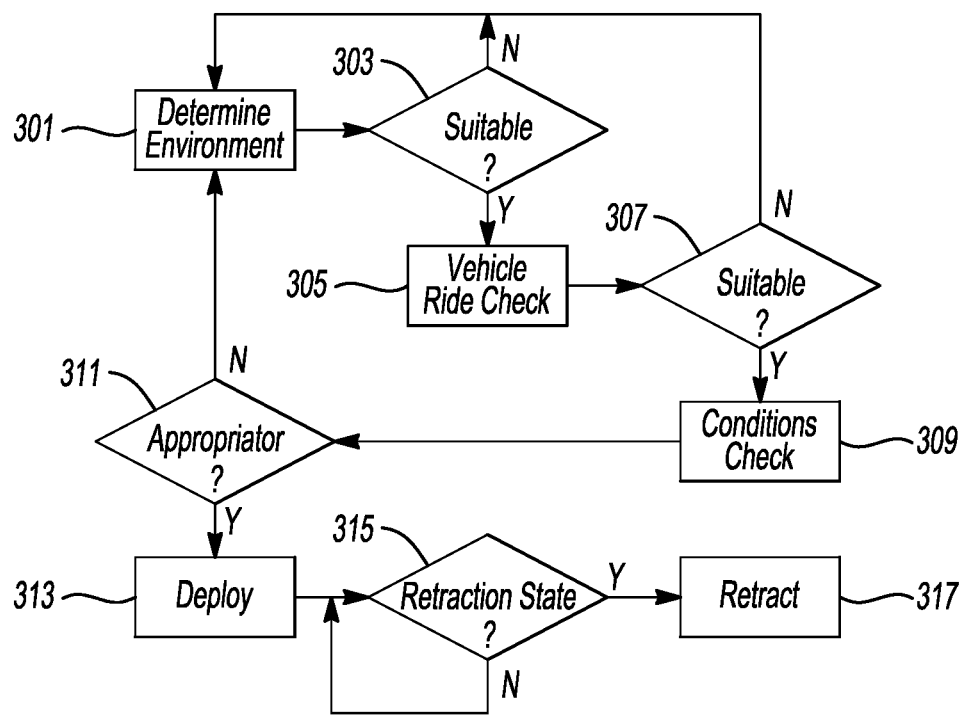
*Fig-3*

DYNAMICALLY DEPLOYABLE ADAPTIVE MUD FLAPS

TECHNICAL FIELD

The illustrative embodiments generally relate to dynamically deployable adaptive mud flaps.

BACKGROUND

Vehicles are designed to travel through all sorts of environment and road conditions, including snow, mud, ice, etc. As a vehicle travels, the tires tend to spray any loose debris or precipitate rearwards of a given tire. In the complete absence of mud flaps, much of this sediment would deposit along the vehicle body. Moreover, vehicle bodies are not typically completely smooth, with protrusions for styling and functional purposes, and these represent accumulation points for sediment. If the sediment is of a rigid nature, it can also nick the vehicle paint or dent a body part.

Traditional mudflaps solve some of the preceding issues by preventing a significant portion of spray from reaching the more sensitive areas of the vehicle. While this may suffice in many circumstances, some vehicles travel in conditions that result in heavy spray (be it mud, snow, ice, water, etc.) and conventional mudflaps may struggle to contain all of this spray. At the same time, making mudflaps that extend beyond conventional dimensions can create clearance issues and the possibility of tear-off. While mudflaps tend to be made of resilient material, they can still become affected through ground or object contact, and when torn off, require repair since their functionality becomes partially or completely lost.

SUMMARY

In a first illustrative embodiment, a vehicle includes one or more actuatable mudflap portions provided to the vehicle, capable of deployment and retraction to respectively increase and decrease deflection of wheel-spray and one or more processors configured to receive vehicle sensor information indicating driving conditions. The one or more processors are also configured to examine the sensor information to determine the presence of a first condition predefined as suitable for deployment of at least one of the mudflap portions. Further, the one or more processors are configured to examine the sensor information to determine that no one or more of second conditions predefined as blocking deployment are met and responsive to the presence of the first condition and the absence of the second conditions, automatically deploy the at least one mudflap portion.

In a second illustrative embodiment, a vehicle includes one or more actuatable mudflap portions provided to the vehicle, capable of deployment and retraction to respectively increase and decrease deflection of wheel-spray and one or more processors configured to receive vehicle sensor information indicating values of variables predefined as factors affecting deployment of at least one of the mudflap portions. The one or more processors are configured to examine the sensor information to determine weighting associated with the factors, based on the values of variables associated with corresponding factors, aggregate the weighted factors to determine if criteria for deployment of at least one of the mudflap portions is met, and, responsive to the criteria being met, automatically deploy the at least one mudflap portion.

In a third illustrative embodiment, a vehicle includes one or more actuatable mudflap portions provided to the vehicle, capable of deployment and retraction to respectively increase and decrease deflection of wheel-spray and one or more processors configured to receive information indicative of accumulation of at least one of ice or mud on a deployed mudflap portion. The one or more processors are also configured to determine that the accumulation meets a threshold for retraction of the deployed mudflap portion and automatically retract the deployed mudflap portion to clean the accumulation.

BRIEF DESCRIPTION OF THE DRAWINGS

FIGS. 2A and 2B show illustrative deployment configurations;

FIG. 3 shows an illustrative process for reactive deployment;

DETAILED DESCRIPTION

Figure 1:
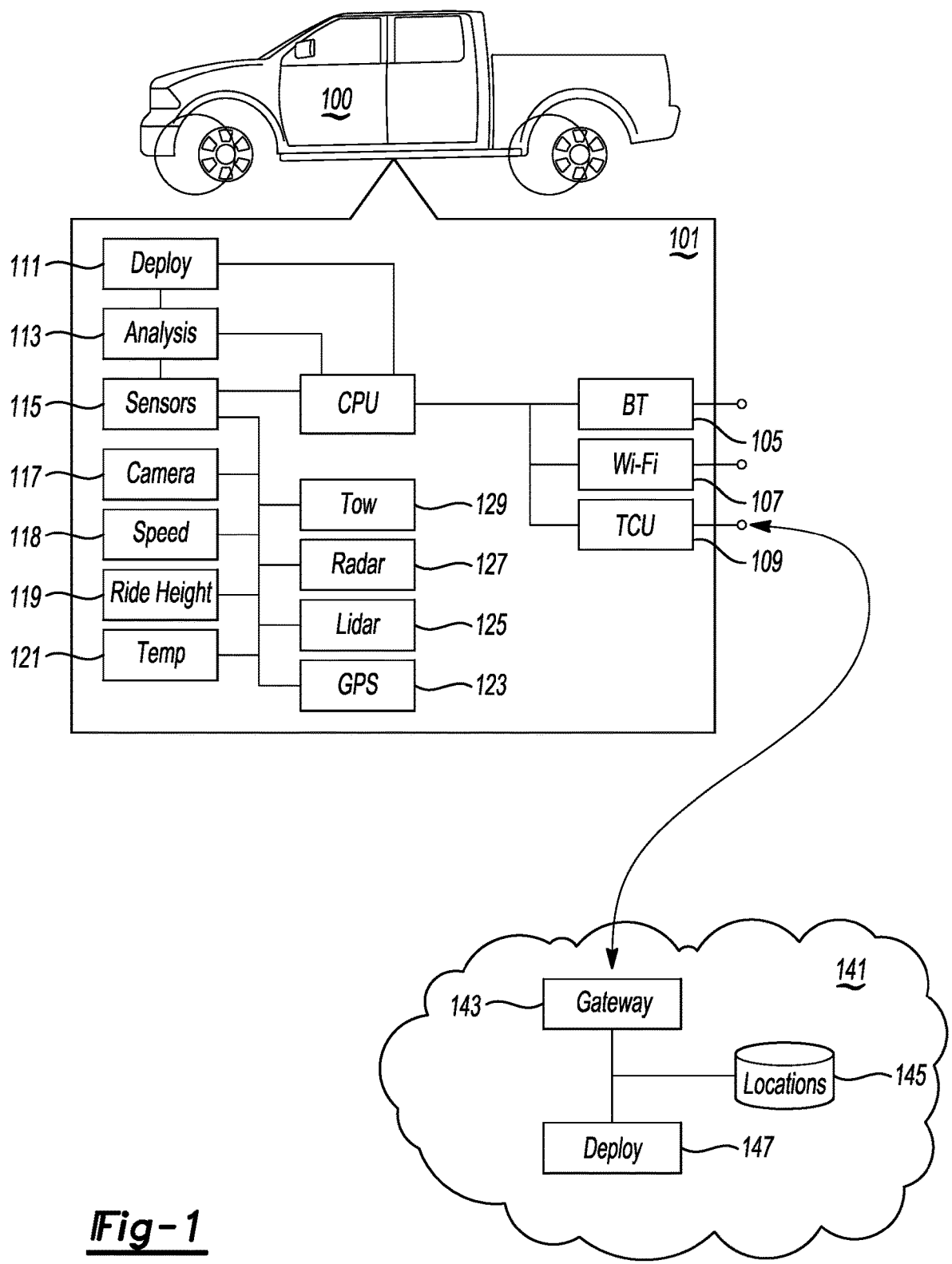
FIG. 1 shows an illustrative vehicle with deployable mudflaps.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments, particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

Execution of processes may be facilitated through use of one or more processors working alone or in conjunction with each other and executing instructions stored on various non-transitory storage media, such as, but not limited to, flash memory, programmable memory, hard disk drives, etc. Communication between systems and processes may include use of, for example, Bluetooth, Wi-Fi, cellular communication and other suitable wireless and wired communication.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

The illustrative embodiments propose dynamically deployable adaptive mudflaps that can leverage vehicle sensors and surrounding conditions to determine the suitability of deploying a mudflap extension. The mudflap extension may be larger and better than catching spray than a conventional mudflap, but may also be large enough that it is sub-optimal for deployment as a permanent solution. Through examination of conditions, including, but not limited to, road conditions, weather conditions, vehicle states, etc., it can be determined when it is appropriate to deploy extended mudflaps with limited chance of interference.

Further, since the mudflaps can be actuated, this actuation can be used in conjunction with an oppositional force, such as scraping a surface of the flap against a designated scraping element or against a wheel well interior, to dislodge accumulated mud or snow from the extension, preserving the deflecting capability of the flaps and preventing excessive sediment accumulation. Such actuation can be periodic under certain conditions and/or responsive to vehicle sensor data indicating excess accumulation of sediment.

FIG. 1 shows an illustrative vehicle with deployable mudflaps. This is an example of a vehicle with various illustrative sensing capabilities that can be leveraged as the basis for deployment of extendable mudflaps. In this example, the vehicle 100 includes an onboard computing system 101 that has one or more processors 103 provided thereto. The system also includes short range communication capability, such as a BLUETOOTH transceiver 105 and Wi-Fi transceiver 107, as well as longer-range capability provided by a telematics control unit (TCU) 109, that may include a connection to one or more cellular modems or other cellular connections.

Figure 6:
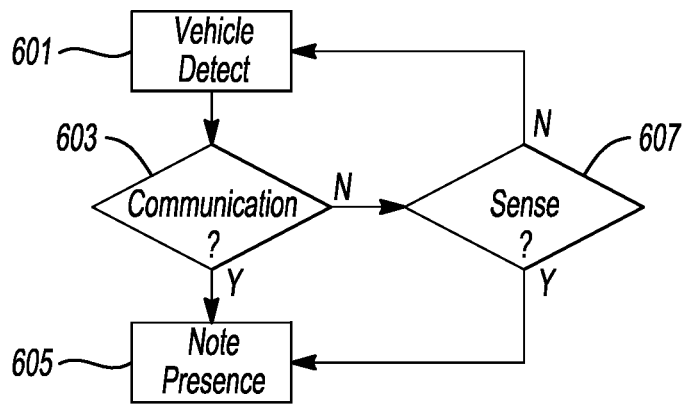
FIG. 6 shows an illustrative courtesy evaluation process.
Figure 7:
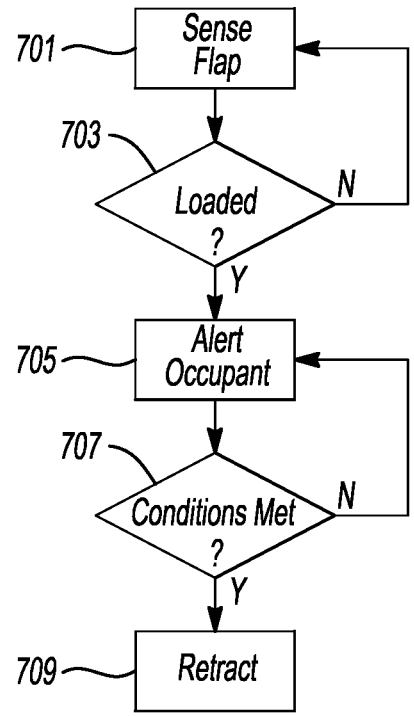
FIG. 7 shows an illustrative self-cleaning evaluation process.

The shorter range capability can be used, for example, for vehicle to vehicle (V2V) communication, which can be a predicate for mudflap deployment or cleaning, as discussed in greater detail with respect to FIGS. 6 and 7. The longer range communication can provide access to the cloud 141, which in this example may include a gateway 143 for handling incoming requests and outgoing responses. The cloud may include various functionality unrelated to the present concepts, as well as support for deployment strategies, which in this example may include, for example, capability to devise deployment instructions 147 as well as a database of location information 145, which may include road, weather, sediment, etc. conditions, indicating suitability of flap deployment based on data sensed from other vehicles and/or gathered from other sources.

Since deployment may need to be reactive to changing conditions, and because communication with the cloud may not always be active, the cloud may indicate state sets that are suitable for deployment at a given location, as well as conditions for retraction that can be sensed by a vehicle. The cloud may also issue retraction alerts, so that vehicles traveling at high rates of speed, such as along a snowy highway, can be notified of possible impediments that could affect a deployed mudflap prior to a point where the vehicle must be relied upon to sense the impediment. This can allow a large portion of traveling vehicles to dynamically retract mudflaps temporarily while passing an area where an issue might occur, and then redeploy the flaps once the obstruction is cleared. Since the spray and visibility conditions associated with ice and snow may make it difficult to observe and react to temporary road obstructions, cloud-assistance in situations such as this may help prevent issues.

The vehicle 100 may also include an onboard deployment strategy 111, which can include both original equipment manufacture (OEM) specifications as well as user-defined specifications. For example, certain users may wish to modify deployment conditions, and may be permitted to do so. If a modified deployment condition increases a likelihood of issues with a flap, the vehicle can either alert the user for confirmation or decline to allow the change. An analysis process 113 can handle incoming sensor data to determine whether deployment or retraction is appropriate under current operating conditions.

The vehicle may also include a variety of sensors 115 useful to determine predicates for deployment or retraction, which in this case can include, for example, cameras 117 that can be used to sense road compositions, presence of precipitate, sediment or debris, accumulation of sediment, variances in road topography, obstructions, etc. Sensors may also include, for example, speed sensors 118, usable to determine whether current speeds are suitable for deployment or dictate retraction. Ride height sensors 119 can determine whether deployed flaps are likely to encounter the road or obstructions. Temperature sensors can be used to determine if, among other things, detected precipitation is likely to form into ice along vehicle panel elements.

GPS coordinates 123 can be used as the basis for consistent deployment at certain locations or roads associated with certain locations. For example, a user could deploy flaps manually or automatically along certain stretches of road. Whenever a vehicle was traveling along that road, and assuming any other predicates for operating conditions were met, the coordinate correspondence of travel to previous deployment locations could be used as the basis for deployment, or at least offering deployment.

LIDAR 125 and RADAR 127 sensors can be used to sense the presence of other vehicles and the presence of obstructions. With regards to other vehicles, flaps may be deployed (when otherwise appropriate) in order to prevent spray from rear tires reaching the other vehicles excessively. When an obstacle or impediment is detected, such as a large rock or other piece of debris, flaps can be fully or partially retracted in order to clear the impediment.

Tow sensors, such as weight, pin sensors, cameras, etc., can be used to detect the presence of a trailer. Flaps may be deployed so as not to spray a trailer with excessive sediment. Flap deployment distances may also be modified in the presence of a heavy trailer to maintain ground clearances from the flaps while also mitigating spray onto the trailer. It may also be possible to modify deployment distances under other conditions, so that a partially increased mudflap profile is achieved while maintaining clearances and accommodating other considerations as necessary.

FIGS. 2A and 2B show illustrative deployment configurations. FIG. 2A shows an illustrative example of a mudflap 201 having an extension 203 provided thereto. In this example, the extension moves vertically 205, but other actuation directions could be possible based on placement of drive-elements and any necessary guidance. Here, the example drive element includes a ball linear screw stepper motor 207 providing vertical refraction and deployment capability.

FIG. 2B shows a mudflap example where the flap 211 is actuatable around a central axis 215, resulting in a swinging deployment 213. This sort of flap may require more deployment space, but the axial pin 215 could be allowed to swing freely to some extent, providing greater resilience against encounters with heavier objects and impediments along the road—i.e., if the flap struck an object, it may be able to swing freely backwards, mitigating tear-off possibility. A similar outcome could be possibly achieved with the flap in FIG. 2A, by allowing axial swing at a connection joint to the drive or by creating the flap from sufficiently flexible material.

While flexible flap material may decrease chances of tear-off, it may also make scraping the flap against a rigid cleaning surface more difficult during retraction, as the flap may flex based on a profile of ice or caked mud, instead of the ice or mud shearing off. Thus, design choices and intended operating conditions may dictate the composition of the flaps and elements—for example, without limitation, self-cleaning flaps may be more rigid and may rely more heavily on sensor data for correct deployment, although this does not necessarily have to be the case.

FIG. 3 shows an illustrative process for reactive deployment. In this example, the process examines a variety of operational related conditions to determine whether a flap should be deployed or retracted. The order of examination is not necessarily important, and these are illustrative factors that can be considered, without intended limitation.

In this instance, the process first examines environmental conditions at 301, which in this example are different from weather conditions. These include, for example, road topography, rise and fall of vehicle, axial movement (e.g., sway), road or terrain composition, etc. In general, these are conditions that relate to an effect that a road may have on deployed mudflaps and/or road-related reasons that mudflaps can or should be deployed. More specifics related to conditions are discussed below, with respect to FIG. 4.

If the road and environmental conditions are suitable at 303, the process may move to checking ride-characteristics of a vehicle at 305. By way of illustrative, this could alternatively include sway and/or ride heights, as well as other axial movement, speeds, wheel slip, etc. Additional factors and their evaluation is discussed below with respect to FIG. 5. If the vehicle ride characteristics are suitable at 307, the process may move to a conditions check at 309.

The conditions check can include, for example, weather, precipitation, standing snow or water, GPS correlation to weather events, surrounding vehicles, etc. If the conditions are also appropriate for deployment at 311, the process can deploy the mudflaps at 313. Once the mudflaps are deployed, the process can continue to examine all the predicates or a subset of the predicates at 315 flagged for deployment, which, if changed to certain other states, may signal a cause for retraction at 317.

With regards to predicates in general, some may represent prohibitive predicates, that is, those which indicate deployment is unsuitable. Since the mudflaps may not be necessarily considered a mandatory deployment, but rather an additional barrier to spray, it may be that OEMs or customers carefully choose conditions under which deployment is the least or less likely to result in issues with the deployed flaps.

For example, without limitation, and not to suggest that any of the following are necessarily fixed conditions for preventing deployment—i.e., they can always be optionally circumvented, prohibitive conditions may include heavily varied topography, road impediments, sandy conditions, low speeds, high speeds, etc.

Varied ride heights and varied topography may incentivize against deployment, since it may be difficult to react timely to a change in surface height and the mudflaps may encounter an obstruction. The same can be true for the detected presence of impediments (e.g., curbs, large rocks, etc.). Sandy terrain can cause wheels to sink, creating encounter issues. Low speeds may be indicative of the likely presence of curbs and other parking related structures, even when not detected. High speeds may result in increased drag created by the mudflaps, affecting vehicle efficiency.

Whether or not a flap is deployed or retracted can be an evaluation resulting from a combination of factors, and may be based on a perceived chance of a flap encountering an obstacle. For example, high speeds may not be a prohibitive factor in the presence of precipitation, as they may not indicate an increased chance of encounter, but may simply result in improved fuel efficiency when flaps are raised. In such an instance, an OEM or owner may rather decrease the effect of snow or mud rather than attempt to marginally save on fuel usage.

Other prohibitive predicates may indicate a greater chance of encounter, such as low speeds, especially when a vehicle is not on a marked road (e.g., in a parking lot). Spray will be diminished at low speeds in any event, as well as the velocity of spray, so the effect of spray will be diminished. That may not justify deployment, if the chance of flaps striking an object in increased.

Changing road topography may be a judgement call, based on the level of spray or precipitate—some drivers may prefer to protect the vehicle from accumulation over protecting the mudflaps from striking objects. Any deployment can ultimately be a judgment call of a driver, the driver may always be able to manually override a predicate and deploy or retract the flaps, and if the vehicle has observed a reason to question this decision, the vehicle may present the information to the driver for confirmation.

In general, the decision to deploy can be thought of, in one paradigm, as a deployment that is not necessary under many conditions, that can occur when there are reasons to deploy the flaps, unless there is sufficient reason not to deploy the flaps. That is, on a dry, flat road free of debris or precipitate, the deployed flaps may provide little advantage, and if it starts to snow, that could be a reason to deploy the flaps, unless there is an increased chance of a flap striking an object and if the driver values mud flap retention over, for example, a vehicle paint job or body condition.

Figure 4:
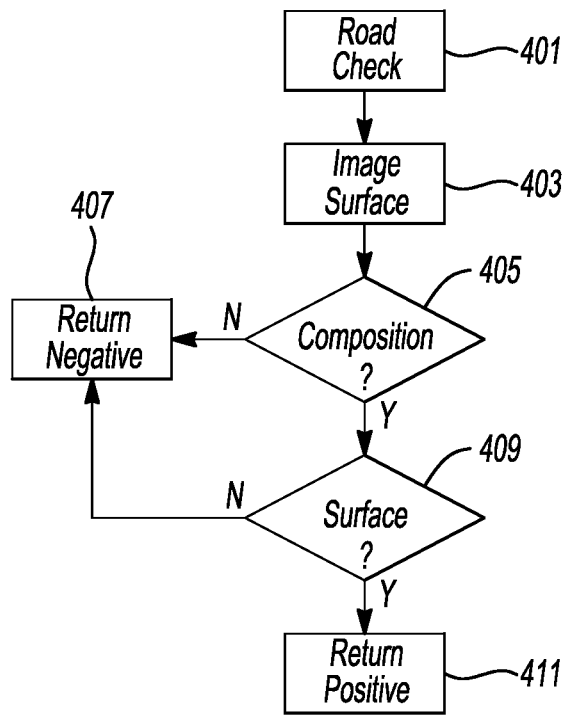
FIG. 4 shows an illustrative road analysis process.

FIG. 4 shows an illustrative road analysis process. In this example, the vehicle examines a road surface at 401 for the presence of elements that may either positively or negatively alter a decision to deploy mudflap extensions. For example, the vehicle 100 may image the road surface with a camera at 403. This image can be used to determine, for example, the composition of a road at 405, which can include materials, presence of loose material, presence of sediment or irregularities, etc. If the composition aligns with a composition designated as unsuitable for deployment, i.e., it is a fixed predicate for non-deployment (or for retraction), the process can return a negative road state at 407.

In this example there are hard and soft predicates, which can be thought of as preventative and suggestive predicates. Drivers or OEMs may tune these variables so that certain variables are fixed as non-deployment variables while other variables are weighed in sum with all considerations before making a final determination. It is also possible to treat all variables as soft variables and, for example, simply provide the driver with complete information and let the driver make the ultimate decision.

If the conditions are appropriate at 405, the process may also examine the surface of the road for shifting topography, large impediments and the presence of, for example, potholes. LIDAR and other sensors can also aid in this evaluation, as well as evaluation in variance observed in suspension activation. Swiftly changing road surfaces may make it difficult for a vehicle to retract flaps in time to clear encounters, and so roads with variances in topography over a threshold may result in hard non-deployment decisions, whereas roads with mild variance may represent a soft condition to be considered. Roads with very smooth surfaces may simply represent a non-variable, as the road surface may not be a factor in the ultimate decision when it will not likely create an issue.

In this example, if there are no prohibitive predicates observed in the road analysis, the process may return a positive at 411, indicating that the road does not create deployment issues. Additionally or alternatively, the process may return the states of various observed soft variables that may have an effect on the ultimate decision to deploy or retract a flap.

Figure 5:
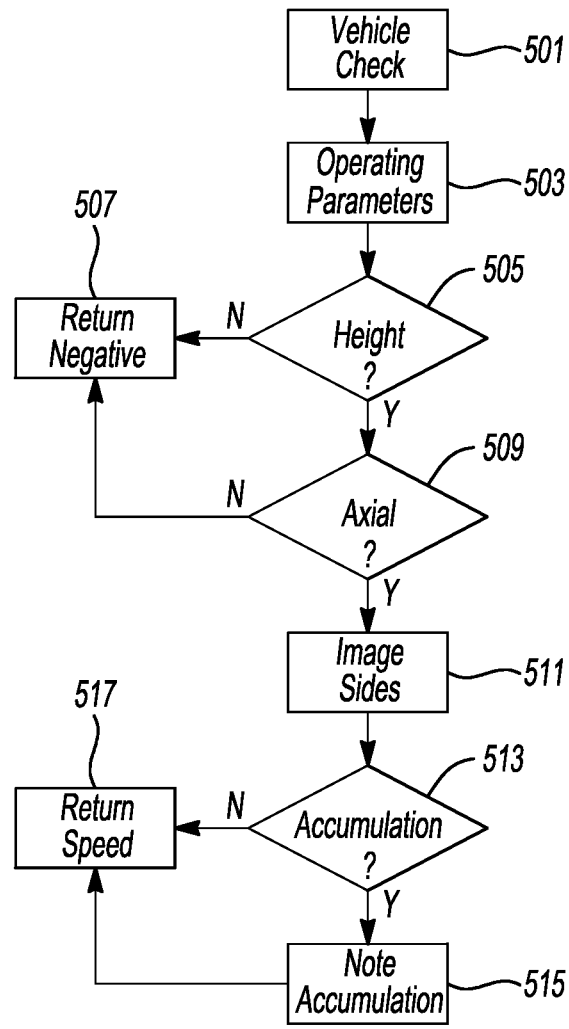
FIG. 5 shows an illustrative vehicle state analysis process.

FIG. 5 shows an illustrative vehicle state analysis process. Again, certain variables may be thought of as hard or soft variables, in this example, but that is not the only way to contemplate the vehicle state conditions. Here, the process examines the vehicle operational state at 501, by retrieving certain operational parameters at 503 as reported by various vehicle systems capable of reporting observed values.

For example, certain road heights at 505 may serve has hard predicates against deployment because of a high likelihood of contact with a deployed flap. On the other hand, if the flaps are partially deployable, the presence of varied road heights may simply serve to set a suggested maximum deployment.

Axial sway at 509 may indicate the presence of high winds or uneven terrain, which also may be impediments to deployment. Vertical movement may indicate bumpy or uneven terrain. These can be reported at negative conditions at 507 if sufficient to block deployment, or the variables can ultimately be reported to be used in a decision matrix when deciding about deployment and maximum deployment heights if variable deployment is possible.

Vehicle predicates that may serve to encourage deployment can include wheel slippage indicative of ice or mud, and speeds at levels that either do not indicate the likelihood of curbs or impediments (e.g., not too slow), or at levels where wind resistance is considered negligible (e.g., not too fast).

In another example, side-viewing cameras, such as mirror cameras, can detect the buildup of ice or mud based on imaging the vehicle sides at 511. Even when not available, the buildup may be somewhat assumed based on a detected presence of ice or mud on forward-facing cameras, such as bumper adjacent cameras. If the cameras or other sensors indicate excessive accumulation of sediment at 513, this can be noted at 515 as a factor in favor of deployment.

Finally, in this example, speed values can be returned at 517 to be weighed into any eventual decision. As previously noted low speeds may weigh heavily in favor of non or partial deployment, high speeds may indicate a limited reason not to deploy unless there is a better reason (e.g., snow or ice) to deploy. It is also worth noting that it is possible for the flaps to be generally deployed and to operate the conditionals in reverse as a practice—i.e., the vehicle is primarily making decisions about when to retract as opposed to when to deploy and deployment may represent the more persistent state. This has the advantage of preventing more random incidents with the trade-off of increased chance of a flap striking an obstruction.

FIG. 6 shows an illustrative courtesy evaluation process. In this example, the vehicle 100 uses sensors and/or information to detect at 601 the presence of another vehicle. For example, a trailing vehicle could be sensed in proximity by cameras, radio signals, LIDAR, RADAR, etc. In the presence of spray or precipitate, this could be a reason to deploy flaps or rear flaps, which may otherwise not be deployed.

Although this is not necessarily of direct interest to the driver of the vehicle deploying the flaps, it is still polite and may come at limited to no effect on the deploying vehicle. Moreover, trailing and surrounding vehicles may be assisting the driver of the deploying vehicle by using their own camera systems to identify build-up and notifying the object vehicle, using V2V communication, of the presence of lateral build-up along the vehicle.

In this example, the vehicle 100 either senses the trailing or proximate vehicle at 607 or receives communication at 603 indicating the presence of the vehicle. Even if the trailing vehicle is some distance behind the object vehicle, the spray from the rear tires may be creating visual obstruction and the driver of the trailing vehicle may request deployment assistance.

In this example, the process reports the presence of the vehicle at 605, as a factor to be weighed, because there may be countervailing reasons not to deploy the flaps. The driver may also be notified and may choose to deploy the flaps out of sympathy, especially in heavy weather where spray can add to visibility difficulties.

FIG. 7 shows an illustrative self-cleaning evaluation process. In this example, the vehicle can evaluate the presence of build-up on the deployed flaps, or may be notified, from another vehicle, of the presence of build-up. This can include images showing build-up, weight sensing, banging of ice on tires, especially during turns, etc.

Through one or more sensor evaluations the vehicle 100 determines the presence of build-up on a deployed flap at 701. If the build-up is sufficient at 703, or perhaps at intervals when build-up is not above a threshold, just to help ensure no excessive build-up, the process will determine that temporary retraction is appropriate to clean a flap.

As noted before, this retraction can constitute any reasonable approach. If the flap slides vertically, the slap can be slid against a scraper or wheel well to free built-up sediment. If the flap deploys axially (swinging), it may be possible to actuate the flap to bang it against a vehicle surface. In other instances, the mere act of retracting a swinging flap may cause the mass affixed to the flap to dislodge under its own weight.

The process may also alert the occupant that flaps will be retracted at 705, in case the occupant wants to change a driving state to accommodate this, such as changing a speed or path based on a desire not to operate the vehicle at high speeds without the added protection of the deployed flaps. If the occupant permission is needed, or when any other conditions for retraction are met at 707, if there are any conditions for retraction, then the vehicle 100 can retract the flap at 709, repeatedly if necessary, to dislodge accumulated sediment. Conditions for deployment may also be rechecked if the flap is to be redeployed after cleaning.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   one or more actuatable mudflap portions provided to the vehicle, capable of deployment and retraction to respectively increase and decrease deflection of wheel-spray;
   one or more processors configured to:
   receive vehicle sensor information indicating driving conditions;
   examine the sensor information to determine the presence of a first condition predefined as suitable for deployment of at least one of the mudflap portions;
   examine the sensor information to determine that no one or more of second conditions predefined as blocking deployment are met, wherein the one or more second conditions include road topography changes above a deployment threshold; and
   responsive to the presence of the first condition and the absence of the second conditions, automatically deploy the at least one mudflap portion.

2. The vehicle of claim 1, wherein the one or more processors are further configured to continue to receive and examine the sensor information for the presence of the second conditions during a deployed state of the at least one portion and, responsive to the sensor information indicating at least one of the second conditions, retract the deployed mudflap portion.

3. The vehicle of claim 1, wherein the first condition includes at least a determined presence of at least one of gravel, snow, ice or mud on a road surface.

4. The vehicle of claim 3, wherein the presence of the at least one of gravel, snow, ice or mud is indicated based on the sensor information, including at least camera information or wheel slip information.

5. The vehicle of claim 1, wherein the first condition includes accumulation of at least one of mud or ice laterally along a vehicle.

6. The vehicle of claim 3, wherein the presence of the accumulation is indicated based on the sensor information, including camera information.

7. The vehicle of claim 1, wherein the one or more second conditions include speed predefined as too slow for deployment.

8. The vehicle of claim 1, wherein the road topography chances are indicated based on sensor data, including at least one of ride height information, suspension information or camera information.

9. The vehicle of claim 1, wherein the one or more second conditions include a detected presence of impediments proximate to the vehicle and above a threshold in height.

10. A vehicle comprising:
    one or more actuatable mudflap portions provided to the vehicle, capable of deployment and retraction to respectively increase and decrease deflection of wheel-spray;
    one or more processors configured to:
    receive vehicle sensor information indicating values of variables predefined as factors affecting deployment of at least one of the mudflap portions, wherein at least one of the variables is predefined as a controlling variable, the presence of a value for which is predefined as blocking deployment regardless of other variable values;
    examine the sensor information to determine weighting associated with the factors, based on the values of variables associated with corresponding factors;
    aggregate the weighted factors to determine if criteria for deployment of at least one of the mudflap portions is met; and
    responsive to the criteria being met, automatically deploy the at least one mudflap portion.

11. The vehicle of claim 10, wherein the one or more processors are further configured to continue to receive and examine the sensor information to reweight the factors based on changes to the respective variable values and, responsive to the criteria no longer being met based on aggregation of the reweighted factors, retrace the at least one mudflap portion.

12. The vehicle of claim 11, wherein the variables include one or more of at least road topography, vehicle speed, presence of precipitation, accumulation of ice or mud laterally along a vehicle, detected presence and height of impediments, or presence of a trailing vehicle.

13. A vehicle comprising:
one or more actuatable mudflap portions provided to the vehicle, capable of deployment and retraction to respectively increase and decrease deflection of wheel-spray;
one or more processors configured to:
receive information indicative of accumulation of at least one of ice or mud on a deployed mudflap portion;
determine that the accumulation meets a threshold for retraction of the deployed mudflap portion;
automatically retract the deployed mudflap portion to clean the accumulation.

14. The vehicle of claim 13, wherein the information includes at least a camera image of the deployed mudflap portion.

15. The vehicle of claim 13, wherein the camera information is provided via communication from another vehicle.

16. The vehicle of claim 13, wherein the one or more processors are further configured to redeploy the mudflap portion immediately subsequent to retraction to clean the accumulation.

17. The vehicle of claim 13, wherein the information includes drag on the mudflap portion indicated by at least one sensor of the vehicle.

18. The vehicle of claim 13, wherein the one or more processors are further configured to successively retract and deploy the mudflap portion either at least one of a predefined number of times or until subsequently received information indicative of accumulation.

* * * * *